United States Patent [19]

Rickert

[11] 4,322,743
[45] Mar. 30, 1982

[54] BRIGHT PICTURE PROJECTION INCLUDING THREE DIMENSIONAL PROJECTION

[76] Inventor: Glenn E. Rickert, Rte. 9, Huntington, Ind. 46750

[21] Appl. No.: 82,876

[22] Filed: Oct. 9, 1979

[51] Int. Cl.³ .............................................. H04N 9/54
[52] U.S. Cl. .................................... 358/88; 358/238; 358/60; 353/77
[58] Field of Search ................ 358/88, 231, 237, 238, 358/60; 353/97, 98, 119, 122, 74, 77

[56] References Cited

U.S. PATENT DOCUMENTS 2,783,406  2/1957  Vanderhooft ........................ 358/41
3,046,330  7/1962  Ross .................................... 358/91

Primary Examiner—Robert L. Richardson
Assistant Examiner—Edward L. Coles
Attorney, Agent, or Firm—Roger M. Rickert

[57] ABSTRACT

A method is disclosed of projecting images on a screen which are so bright as to be easily visible in a lighted room, including projecting a pair of stereoscope pictures which can be seen in three dimensions without the observer wearing special spectacles or using other personal optical aids. The combination includes a large projection optic combined with a special screen which acts as a screen but which also has focus power and casts an image of the projection optic out in space in a limited viewing area for the observer's use in viewing a single two dimensional picture. In a modified form of the invention the large projection optic is divided into an array of segments where adjacent pairs of segments separately project each of a pair of stereoscopic pictures onto the screen. The screen as a focusing device is focused not on the picture but on the projection optic segments and casts an image of each segment out into space as adjacent limited viewing areas for a pair of observer's eyes to see the pair of stereoscopic pictures separately so he can see them as a three dimensional picture without wearing special glasses.

9 Claims, 5 Drawing Figures

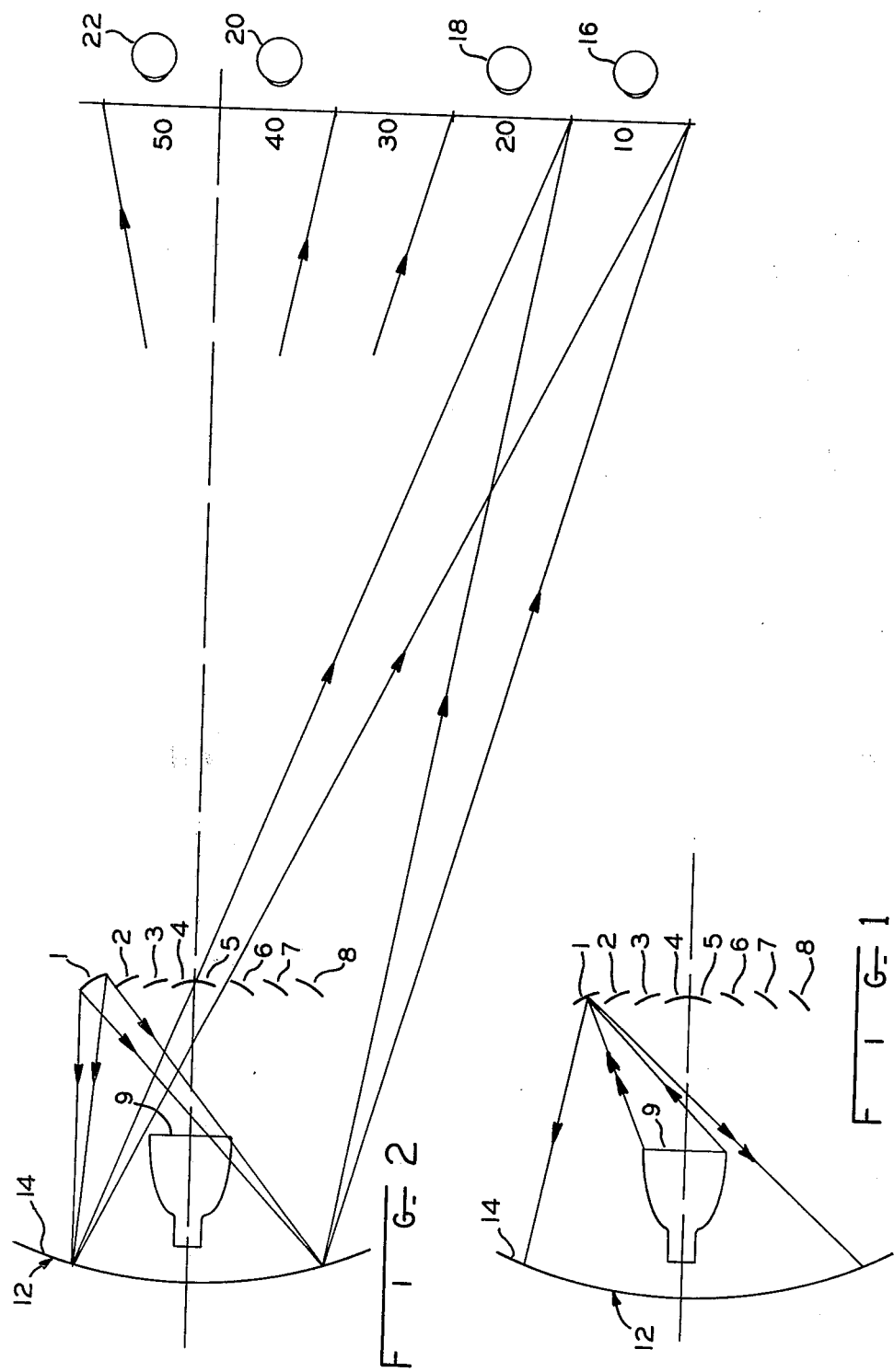

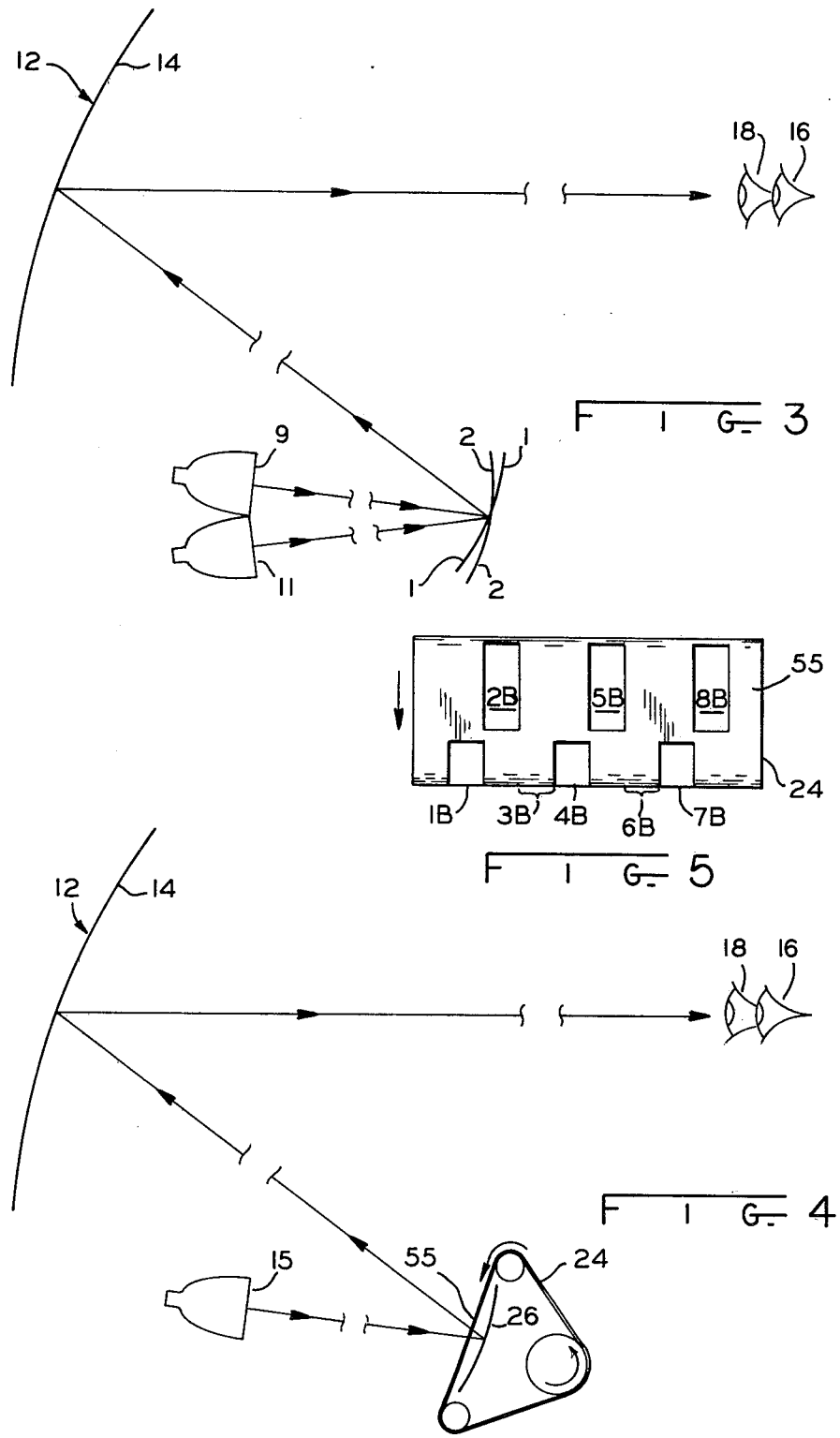

BRIGHT PICTURE PROJECTION INCLUDING THREE DIMENSIONAL PROJECTION

BACKGROUND OF THE INVENTION

The present invention relates to conventional pictures projected onto a screen and also to a pair of projected stereoscopic pictures to be viewed as a three dimensional picture.

Conventional picture projection requires that the projection room be darkened to properly see the pictures. The present invention provides projected two dimensional pictures of such brightness that they can easily be seen in a normally lighted room.

The use of a pair of stereoscopic pictures to create the illusion of seeing the scene in three dimensions has been in use for many years. A pair of projected stereoscopic pictures, however, requires that only one picture be viewed by only one eye while the other eye views only the other picture. In the past this has required the observer to wear a special pair of picture separating spectacles. This requirement has seriously limited the use of three dimensional pictures. The present invention also provides projected stereoscopic pictures which can be viewed without wearing special spectacles.

A few years ago, theater motion pictures and home slides were projected onto a screen as three dimensional pictures, but as they required the observers to wear special colored or polarized eyeglasses to prevent one eye from seeing both pictures, the practice fell into disuse.

The requirement to wear prismatic lenses, colored lenses, polarized lenses, or any form of limiting spectacles with which to view stereoscopic pictures is not only inconvenient, it is also very confusing and awkward if the observer tries to move around or even look around the room while wearing devices of this nature.

SUMMARY OF THE INVENTION

Among the several objects of the present invention may be noted the provision for projecting two dimensional pictures onto a screen which are sufficiently bright as to be easily visible in a normally lighted room; the provision for projecting three dimensional pictures onto a screen which are not only sufficiently bright as to be easily visible in a normally lighted room, but also which three dimensional projected pictures can be viewed in three dimensions without the observer wearing special spectacles or other personal optical aids.

A better concept of the invention may be had if it is understood that the special focusing screen is adapted to direct and concentrate essentially all of the light that comes from the projection optic, out into a well defined and limited space, as an image of the projection optic. This image of the projection optic is called a viewing area and only within this area can the picture on the screen be seen. It is important to keep in mind that from one viewing area only one picture can be seen even though several other pictures may be on the screen also.

Although concave focusing mirrors are described and shown as the focusing optics, it should be understood that other focusing optics can be employed including light transmitting refractive lenses, prismatic lenses, fresnel lenses, fresnel mirrors, and other varieties of optics. Lenses, mirrors and prisms may be combined.

In general and in one form of the invention each of a series of separate but adjacent pairs of projection optics project an image from one of a pair of stereoscopic pictures onto a special screen, the series of which are superimposed on the screen.

Although these separate adjacent projection optics project images in a superimposed position on a common screen, it is important to recognize that they do it from different locations. Additionally, they can be seen only from different locations.

The special screen has focusing or light concentrating capability such that the light falling on it to create a picture on it from a projection optic is directed, concentrated and cast like an image of the projection optic out into a removed but defined area called a limited viewing area. As there are several separate projection optics projecting light onto the screen from several separate locations, the special screen casts or directs the light from each out into several remote but separate and corresponding viewing areas.

Thus is provided a corresponding series of separate but adjacent pairs of viewing areas at which a series of observers may position their pairs of eyes to view the pair of pictures in three dimensions. Again, only one picture of the stereoscopic pair of pictures is visible from any one limited viewing area.

In a second form of the invention the series or array of projection optics is substituted by a large one piece concave mirror projection optic employing a rolling belt shutter to expose only the desired portion of the projection optic at any one time. This form of the invention can employ a single television tube with the pair of stereoscopic pictures appearing intermittently, and alternately on the tube face. The roll curtain shutter is synchronized with the alternating and intermittent appearance of the pair of stereoscopic pictures on the television tube.

In a third form, the use of the invention principles can provide exceptionally bright projected two dimensional television pictures. The large one piece concave mirror projection optic is used along with the rest of the equipment of the second form of the invention, but in this third form only one picture is employed and the rolling belt shutter is not required to project the single picture to be viewed as a two dimensional picture.

This invention provides projected pictures of such exceptional brightness on the screen regardless whether they are in two or three dimensions, that it does not require dimming the lights in the room to watch the picture as is conventionally required for projected television, slide, and movie viewing.

BRIEF DESCRIPTION OF THE DRAWING

FIG. 1 is a top view of a series of concave projection mirror optics with a focusing screen and employing a pair of continuous pictures on a television tube face;

FIG. 2 is a top view of the same equipment of FIG. 1, but showing the focusing screen casting images of the series of projection optics out into space for the observer's eyes.

FIG. 3 is a side view of the system shown in FIGS. 1 and 2. Here the tilt of the projection optics are shown to illustrate how images of the separately located tube pictures are projected onto the focusing screen surface in a superimposed fashion.

FIG. 4 is a side view of a modified form of the invention employing an alternating pair of stereoscopic pictures and a roller belt shutter.

FIG. 5 is a face view of the roller belt shutter of FIG. 4.

DESCRIPTION OF THE PREFERRED EMBODIMENT

Consider first FIG. 1 which is a top view of the system. A television tube face picture 9 is shown but another television tube picture face directly below face 9 is not shown. This second now shown face has the second half of the stereo pair of pictures. It is shown as 11 in the side view of FIG. 3.

Continuing with the top view of FIG. 1, a series of adjacent but individual projection optics in the form of concave focusing mirrors numbered 1, 2, 4, 5, 7 and 8 are shown. The optics 1, 4 and 7 project images of the picture 9 onto the screen 12 reflective focusing face 14. The optics 2, 5 and 8 project images of the picture provided by the tube not shown below 9, onto the screen 12 face 14 in a similar manner and superimposed on the image of picture 9. Spaces 3 and 6 are blanks and project no light onto the screen 12 face 14. These blanks can be nonreflective mirrors or just spaces. These blanks are provided to eliminate the possibility of negative stereopsis being seen by the observer locating himself so his left eye sees a picture intended for his right eye while his right eye is seeing a picture intended for his left eye.

Although the system shown here provides for only three observers simultaneously, additional pairs of projection optics are anticipated to provide for additional observers.

Clarity is served by noting a first ray having single arrow marks to distinguish it from a second ray having double arrow marks.

The focusing screen 12 has a concave focusing reflective face 14 which face acts both as a screen upon which to see a projected picture, but which also acts as a focusing surface to direct all of the light from the projection optic 1 into a limited viewing area or strip 10 (FIG. 2) for the use of one eye 16 (FIG. 2) of an observer.

This FIG. 2 is a top view of the same equipment shown in FIG. 1, but FIG. 2 shows the focusing effect of the focusing screen 12 reflective face 14. The face 14 casts a beam from the projection optic 1 and creates a well defined focused image of projection optic 1 in the observer's location as a limited viewing area or strip 10. These images or viewing strips are narrow in width. A practical width can be two and one-half inches to as much as four inches. This permits the observer to locate his one eye 16 in the area or strip 10 cast by optic 1 to see one half of the stereo pair of pictures while his other eye 18 is in the adjacent area or strip 20 cast by optic 2 to see the other half of the stereo pair of pictures on the screen 12 face 14. The rays from optic 2 are not shown but they are also projected by the screen face 14 as the image on limited viewing area or strip 20 for eye 18. In this manner eye 16 does not see any light from optic 2 and eye 18 does not see any light from optic 1 even though both optic 1 and optic 2 project their stereoscopic pictures on the screen in a superimposed fashion. As optic 1 is in a different location than optic 2, its image falls in a different location to provide a separate viewing area.

Images from viewing strips from segments 4 and 5 fall in the areas of 40 and 50 for another observer's pair of eyes. Ray diagrams are not shown from optics 7 and 8 but they project viewing areas likewise.

The stereoscopic picture separation will be more fully understood by studying FIG. 3 where a side view of the equipment of FIGS. 1 and 2 is shown. Here both of the stereoscopic pictures 9 and 11 are shown as well as the relative tilt of the projection optics 1 and 2, which tilt serves to superimpose images of pictures 9, 11 on the screen 12 face 14.

The light from picture 9 by way of optic 1 is additionally focused and concentrated by surface 14 to be directed to eye 16. The light from picture 11 by way of optic 2 is also additionally focused by surface 14 in a like manner. Because optic 2 is lateral to optic 1, the light from optic 2 falls at a lateral location 20 (FIG. 2) and provides a viewing area 20 (FIG. 2) separated from viewing area 10 (FIG. 2).

Because FIG. 3 is a side view, the two ray pathways are shown as a single line as they go to the laterally located eyes 16, 18 (FIG. 3).

The stereoscopic pair of pictures 9 and 11 (FIG. 3) can be continuous as opposed to intermittent, and can be transmitted to the receiver over two separate television channels if desired. Other systems of transmission can be employed including alternate intermittent transmission on a single channel.

A modified form of the invention is shown in FIG. 4 in a side view of the equipment where the pair of stereoscopic pictures appear on a single tube face 15 at alternate times in an intermittent fashion. In order to separate the visibility of these singly located pair of pictures into lateral viewing areas like areas 10, 20 of FIG. 2, a rolling belt shutter 24 is provided to expose only the proper areas of the large concave mirror projection optic 26 at the proper time. The rolling belt shutter 24 has openings on its face 55 which travel in a synchronized manner with the intermittent picture appearances. This belt shutter serves to substitute for the effect of the tilted optics 1, 2, 4, 5, 7 and 8 of FIGS. 1 and 2, and separates the visibility of the stereo pictures in a similar manner at areas 10, 20 as shown in FIGS. 1 and 2.

FIG. 4 also shows a pair of light pathways to the pair of eyes 16, 18 as a single ray because of the laterally separated rays not being visible in a side view.

FIG. 5 is a face 55 view of the rolling belt shutter 24 of FIG. 4 where opening 1B substitutes for optic 1 of FIG. 2, shutter 2B substitutes for optic 2 of FIG. 2, and the closed areas 3B and 6B substitute for the blank segments of 3 and 6 of FIG. 2. Openings 4B, 5B, 7B and 8B of FIG. 5 likewise substitute for optics 4, 5, 7 and 8 of FIG. 2. This group of shutter openings along with exposed concave mirror portions of optic 26 provide viewing strips or areas similar to the areas or strips 10, 20, 40, 50 etc. of FIG. 2.

The principles and equipment of FIGS. 1, 2 and 3 can be combined with the equipment of FIGS. 4 and 5 to provide at least a foursome of stereo pictures and a foursome of adjacent viewing areas instead of the pair of stereo pictures and pair of adjacent viewing areas as shown. This foursome of stereo pictures or more can be provided by a transmitter studio camera which takes four or more pictures of the scene from four or more viewpoints, each lateral to the adjacent viewpoint, instead of from only two viewpoints. If four are chosen this can be four cameras or a special camera having four lenses or be elsewise designed to achieve four viewpoints. The foursome of viewing areas permits the observer more lateral movement and less restriction in viewing position than a system employing only two stereoscopic pictures.

If each of the concave mirror projection optics are one inch wide and twelve inches long and if the focusing screen is designed to accurately focus images of the projection optics out in space and magnified just three times in size, the viewing areas would each be three inches wide and three feet high. This is a practical size for the viewing areas for both sitting and standing observers.

The focusing screen 12 face 14 has been described as a concave reflective focusing optic. This optic can be a true focusing optic or it can be modified from a true focusing optic of the classic concept to be a combination of focus and of dispersion from that focus power. For example, in casting an image of a projection optic one inch wide and twelve inches high, it might be desirable to have the image at the viewing area appear magnified more in one dimension than the other. If a vertical increase is desired, the screen could have a horizontal power of focus in the classic manner but the curve of the vertical power could have fine horizontal ridges throughout that vertical curve, which ridges comprise slight radiuses to provide dispersion of the projection optic image in the vertical direction to achieve more vertical magnification. It must be remembered that the focus power of the screen does not focus an image of the picture but focuses an image of the light beam coming from the projection optic into a limited viewing area and that any portion of that beam after leaving the screen provides visibility of the entire picture on the screen, therefore the beam from the screen to the observer can be scrambled without spoiling the picture on the screen. The word focus as applied to the focus power of the screen is used here to include such light scrambling effects of the screen action as it concentrates the light into a viewing area.

The stereoscopic pictures have been described as falling superimposed on the screen. The pictures not being precisely superimposed is anticipated provided it is not so great to be too uncomfortable or impossible to view.

Because the invention provides projected pictures of such exceptional brightness which do not require the usual darkening of the room to see them, it is also advantageous to employ the invention method to project a single picture as a two dimensional picture on the screen. This can be accomplished by simply eliminating the second picture shown in FIG. 4 and, since it is not needed, the roller belt shutter of FIG. 4 can also be eliminated. This projection method still, however, employs the unique combination of the screen essentially focusing on the projection optic to cast essentially an image of the projection optic out in space at the observer's area as a viewing area and that the picture on the screen can be seen only with the observer's eye or eyes located in the thus provided viewing area.

This projection method further differs from conventional projection methods in that a special projection optic is also required. For example, if an observer of the screen is positioned far off to one side of the screen, the system must have a projection concave mirror optic wide enough so that the image of the projection mirror extends correspondingly far off to one side so as to reach the side position of the observer. Additionally, each observer and each eye of each observer sees the picture on the screen by the use of separate portions of the projection optics. Blocking a portion of the projection optic will prevent the observer seeing the picture on the screen from that corresponding portion of the viewing area. The blocking of a portion of a conventional projection optic in a conventional system merely reduces the brightness of the picture the observer sees.

The present projection method is thus unique in several ways, and this modified form is considered part of the invention.

Other combinations and modifications become obvious once the principles of this invention are understood and such combinations and modifications are considered a part of this invention.

What is claimed is:

1. The method of limiting the visibility of stereoscopic pictures on a screen without the use of special eyeglasses or other picture separating device between the observer's eyes and the screen comprising the steps of:
providing a screen having light concentrating capability;
providing at least two stereoscopic pictures;
projecting a first picture onto said screen with a first projection optic;
projecting a second picture onto said screen with a second projection optic;
directing with the light concentrating capability of said screen, the light from the first projection optic into a first limited viewing area for use by the first eye of an observer;
directing with the light concentrating capability of said screen, the light from the second projection optic into a second limited viewing area for use by the second eye of the observer;
so that the observer can position himself to see the first and not the second picture with his first eye, and see the second and not the first picture with his second eye whereby he can see the pictures as a three dimensional picture.

2. The method of claim 1 wherein the steps of projecting first and second pictures is performed over a sequence of time intervals with alternate ones of the pictures being projected during successive time intervals.

3. The method of claim 1 wherein the repetition rates of both the first and second pictures exceeds the critical flicker frequency.

4. The method of providing sufficiently bright pictures projected on a screen which are adequately visible in a lighted room, and of limiting the visibility of stereoscopic pictures on the screen without the use of special eyeglasses comprising the steps of:
providing a screen having light concentrating capability;
providing at least two stereoscopic pictures;
projecting a first picture onto said screen with a first projection optic;
projecting a second picture onto said screen with a second projection optic;
directing with the light concentrating capability of said screen, the light from the first projection optic into a first limited viewing area for use by the first eye of an observer, the first area comprising a plurality of narrow generally vertical first eye viewing strips;
directing with the light concentrating capability of said screen, the light from the second projection optic into a second limited viewing area for use by the second eye of the observer, the second area comprising a plurality of narrow generally vertical second eye viewing strips, the viewing strips being interspersed among blank strips where neither picture is visible;
so that the observer can position himself to see the first and not the second picture with his first eye, and see the second and not the first picture with his second eye whereby he can see the pictures as a three dimensional picture.

5. The method of claim 4 wherein the first projection optic comprises an array of first optical elements each providing one of the first eye viewing bands and the second projection optic comprises an array of second optical elements each providing one of the second eye viewing strips.

6. The method of claim 4 wherein each strip is separated from the next adjacent like type strip by one each of the other type strips.

7. The method of claim 6 wherein the first picture is a left view and the second picture a right view of a stereoscopic pair so that from an observer's point of view the strips are arranged repetitively from left to right as a left eye viewing strip, a right eye viewing strip, and a blank strip.

8. The method of claim 7 including the additional step of establishing a normal viewing area within which an observer may position himself at any one of several locations to simultaneously see a left view with his left eye and a right view with his right eye.

9. The method of claim 8 wherein an observer within the normal viewing area seeing a left view with his right eye has his left eye positioned in a blank strip while an observer within the normal viewing area seeing a right view with his left eye has his right eye positioned in a blank strip thereby precluding reverse stereopsis.

* * * * *